Feb. 9, 1937. H. FUCHS 2,070,008
HAND BRAKE
Filed Feb. 28, 1935
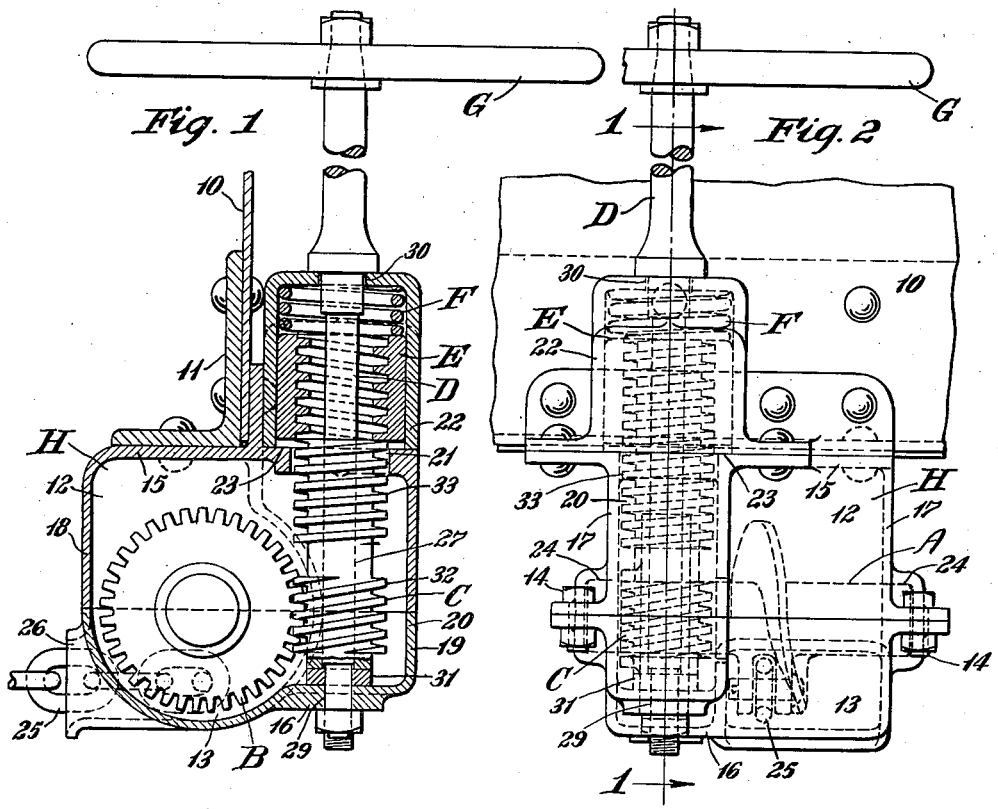
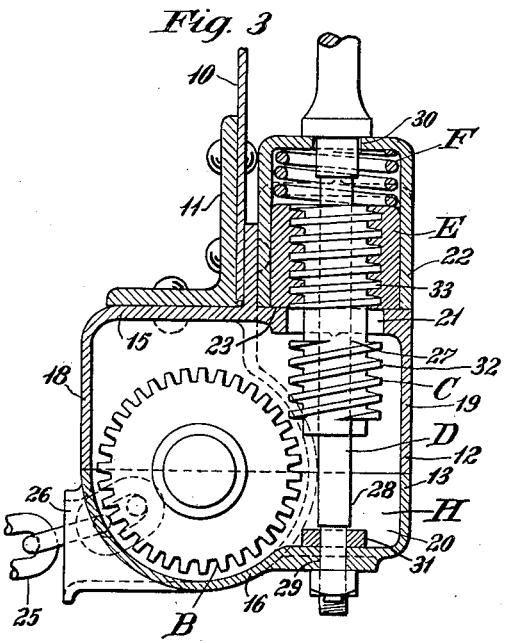
Inventor
Henry Fuchs
Atty.

Patented Feb. 9, 1937

2,070,008

UNITED STATES PATENT OFFICE 2,070,008

HAND BRAKE

Henry Fuchs, Chicago, Ill., assignor to W. H. Miner, Inc., Chicago, Ill., a corporation of Delaware Application February 28, 1935, Serial No. 8,640

14 Claims. (Cl. 74—505)

This invention relates to improvements in hand brakes.

One object of the invention is to provide a simple and efficient hand brake mechanism for railway cars, comprising a chain winding mechanism operated by worm gear means, including a worm wheel and a worm element engageable with the wheel, wherein the entire operation of the brakes is effected through rotation of the usual hand wheel, rotation of the hand wheel in one direction bringing the worm element into engagement with the worm wheel and after engagement of said parts effecting complete application of the brakes, and rotation of said hand wheel in a reverse direction effecting backing off of the brakes to a predetermined extent, followed by complete disengagement of the worm element from the worm wheel to permit free rotation of the winding mechanism to effect full and quick release of the brakes, thus protecting the brakeman from injury due to spinning of the hand wheel, which might otherwise occur.

Another object of the invention is to provide in a hand brake mechanism of the character described in the preceding paragraph, means actuated through rotation of the hand wheel for disengaging the worm element from the worm wheel and reengaging the same therewith, wherein said means becomes operative immediately upon rotation of the hand wheel in chain winding direction to engage the worm element with the worm wheel, and said means further becomes operative to effect gradual backing off of the brakes immediately upon rotation of the hand wheel in chain unwinding direction, followed by disengagement of the worm element from the worm wheel to effect complete release of the brakes.

A more specific object of the invention is to provide in a worm gear driven hand brake mechanism comprising a worm wheel and cooperating worm element, means actuated by rotation of the hand wheel for engaging the worm with and disengaging the same from the worm wheel, by axial displacement of the worm element in a direction tangent to the worm wheel while the worm is being rotated, wherein operation of said means effects said displacement to engage the threads of the worm element with the threads of the worm wheel when the hand wheel is rotated in chain winding direction, and effects gradual displacement of said worm member in a reverse direction while said worm is being rotated to effect backing off of the brakes and final complete disengagement of the worm from the worm wheel, the brake mechanism being so designed that the end thrust of the worm is taken by a fixed thrust bearing during the chain winding operation, and the worm is moved in a direction opposite to the direction of said end thrust to effect disengagement of the worm element from the worm wheel.

Other objects of the invention will more clearly appear from the description and claims hereinafter following.

In the drawing forming a part of this specification, Figure 1 is a longitudinal, vertical sectional view through a portion of the end structure of a railway car illustrating my improved hand brake mechanism in connection therewith, said mechanism being shown in vertical section. Figure 2 is an end elevational view of the structure shown in Figure 1. Figure 3 is a view, similar to Figure 1, but showing the operating parts of my improved brake mechanism in a different position, the operating hand wheel being omitted in Figure 3.

In said drawing, 10 indicates a portion of the end wall of a railway car and 11 the usual end sill. My improved hand brake mechanism is shown as contained in a housing mounted on said end wall 10.

The improved hand brake mechanism comprises broadly a chain winding drum A; a worm wheel B; a worm element C; an operating shaft D for rotating the worm element; a nut E engageable with the worm element to effect axial displacement of the latter; a spring F cooperating with the nut E; a hand wheel G for rotating the shaft D; and a housing H.

The housing H is composed of top and bottom sections 12 and 13 secured together by bolts 14, or any other well-known type of similar fastening elements, extending through outwardly projecting cooperating flanges on said sections. Said housing has top and bottom walls 15 and 16, side walls 17—17, a back wall 18, and a front wall 19. The front wall 19 is offset outwardly, at the left hand end of the housing, as viewed in Figure 2, thereby providing an outwardly enlarged portion 20 on said housing. The top wall of said portion 20 of the housing is provided with a circular opening 21, which is closed by a sleeve-like cap 22 of substantially square cross section. The cross sectional size of said cap is somewhat larger than the opening 21, thereby providing a shoulder 23. The cap is fixed to the housing by rivets or other similar securing elements, extending through suitable flanges at the bottom of said cap and the top of the housing, as clearly shown in Figure 2.

The chain winding drum A and the worm wheel B are preferably cast integral, and said casting is provided with journal portions at opposite ends rotatably supported in suitable bearing openings 24—24 provided in the side walls 17—17 of the housing H. The usual brake chain, which leads to the brake rigging proper, is operatively connected to the drum, the end portion of said chain being indicated by 25 in the drawing. As shown in Figures 1, 2, and 3, the end link of the chain 25 is secured to the drum by a pin extending through said end link and spaced lugs projecting from the drum A. As most clearly shown in Figures 1 and 3, the rear wall 18 of the housing is provided with an opening 26 therethrough to accommodate the chain.

The worm element C is in the form of a cylindrical sleeve having an axial opening 27 of square cross section to accommodate the shaft D. The worm element is slidingly supported on the shaft D, which has a square section 28 fitting the opening 27 of said worm element. The shaft D is journaled in bearing openings 29 and 30 provided respectively in the bottom wall 16 of the housing H and the top wall of the cap 22. The operating hand wheel G is fixed to the upper end of the shaft D, as clearly indicated in Figures 1 and 2. A thrust ring or washer 31 on the lower end portion of the shaft D supports the worm element C on the bottom wall 16 of the housing. At the lower end portion of the worm element C there is provided a right threaded section 32, which normally meshes with the threads of the worm wheel B. Above the section 32 and spaced therefrom, the worm is provided with a second threaded section 33, the threads of which are also right hand but of lesser pitch than the threads 32. As shown most clearly in Figures 1 and 3, the threaded section 33 is of greater length than the section 32, for a purpose hereinafter pointed out.

The nut E has right threads and is arranged within the cap 22. Said nut is of square cross section to fit the opening in the cap and prevent rotation of the nut while permitting vertical sliding movement thereof within the cap. The spring F is interposed between the nut and the top wall of the cap 22 and yieldingly holds the nut engaged with the end of the threads of the section 33 of the worm element C. As shown most clearly in Figure 1, the upper section 33 of the worm element C extends through the opening 21 of the housing and projects above the wall 15 to normally support the nut E clear of said wall.

In applying the brakes, assuming the parts to be in the position shown in Figure 1, the hand wheel G is rotated in a clockwise direction, thereby effecting rotation of the worm element C and the cooperating worm wheel B, together with the chain winding drum A, to wind the chain on said drum. As will be evident upon reference to Figure 1, rotation of the chain winding drum A during tightening of the brakes is in a left hand, or contraclockwise, direction. The pull of the chain on the drum A is thus in such a direction that the thrust on the worm element C will be in a downward direction against the thrust bearing 31, thereby maintaining the parts in the position shown in Figure 1 with the worm C in engagement with the worm wheel B. To effect release of the brakes, the hand wheel G is rotated in a left hand, or contraclockwise, direction, thereby rotating the worm C in a like direction and effecting rotation of the worm wheel B and chain winding drum in a right hand direction, as viewed in Figure 1. During this action, the thrust on the worm C is in a downward direction due to the pull of the chain on the winding drum A. The tendency therefore is for the worm C to remain seated on the thrust bearing 31. Inasmuch as the nut E is yieldingly forced into engagement with the upper end of the thread 33 of the worm C, this thread will be screwed into the nut E during rotation of the worm in unwinding the chain from the drum A. During the time that the thread 33 is being screwed into the nut E, the nut will travel downwardly until it engages the stop shoulder 23. Further rotation of the worm C in chain unwinding direction with cause the worm to travel upwardly in the nut E until the parts reach the position shown in Figure 3 when the worm threads 32 will be completely disengaged from the worm wheel B, thus permitting free rotation of the chain winding drum and complete release of the brakes without further operation or movement of the hand wheel G and the parts connected thereto. As will be evident, due to the difference in pitch of the threads 32 and 33, the worm C will be gradually lifted upwardly to be disengaged from the worm wheel B while the threads 32, cooperating with the threads of the worm wheel B, will effect backing off of the brakes. The parts are so proportioned that the brakes will be backed off to a predetermined extent before the worm is disengaged from the worm wheel to permit proper handling of the car under full control of the brakeman before complete release of the brakes.

In applying the brakes, after the same have been released and the worm has been disengaged from the worm wheel as shown in Figure 3, the hand wheel is rotated in clockwise direction, thereby rotating the worm C. Inasmuch as the worm threads 33 are at this time engaged with the nut E, the worm will be screwed downwardly, thereby bringing the threads 32 into engagement with the threads of the worm wheel B and effecting rotation of the worm wheel B in chain winding direction due to rotation of the worm C while the threads 32 are engaged with the worm wheel. This action continues until the parts again assume the position shown in Figure 1, whereupon downward movement of the worm C is arrested by engagement of the thrust bearing 31. During further rotation of the worm C, the nut will be forced upwardly until it rides on the upper end of the thread 33. The brakes are thus fully applied by further rotation of the hand wheel G, the worm C, and the worm wheel B.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a rotary chain winding element; of cooperating worm and worm wheel member for actuating said winding element; manually operated rotary means for rotating said worm member in reverse directions to rotate the chain winding element in chain winding and unwinding directions; and screw means operated through rotary movement of said worm member for moving the worm axially to engage the worm with the worm wheel, and disengage the same therefrom, said screw means including a threaded section on said worm and a cooperating threaded member, means for holding said threaded member against rotation and guiding the same for axial movement, and abutment means for limiting axial movement of said threaded member and supporting the same while said threaded section is being threaded into said threaded member through rotation of said worm in chain unwinding direction.

2. In a hand brake mechanism, the combination with a rotary chain tightening element; of cooperating worm and worm wheel members for rotating said element; means for rotating said worm member in reverse directions for rotating the tightening element in winding and unwinding directions; and means controlled by rotation of said worm member in brake releasing direction for withdrawing the worm member from engagement with the worm wheel by movement of said worm axially in a direction reverse to the direction of movement of the engaging portion of the worm wheel in effecting releasing action of the brakes, including a nut having limited axial movement, a cooperating threaded portion on said worm member, and means for holding said nut against rotation.

3. In a hand brake mechanism, the combination with a rotary chain tightening element; of cooperating worm and worm wheel members for rotating said element; means for rotating said worm member in reverse directions for rotating the tightening element in winding and unwinding directions; and means for withdrawing the worm means from engagement with the worm wheel, including a nut, a cooperating threaded end portion on said worm member, means for guiding said nut for axial movement and holding the same against rotation, and stop means for limiting movement of the nut toward said threaded end of the worm.

4. In a hand brake mechanism, the combination with a rotary tightening element; of a worm wheel member operatively connected to said element for rotating the same; a nut mounted for axial movement and held against rotation; a stop shoulder for limiting axial movement of the nut in one direction; an axially displaceable rotary worm member having two sets of threads, one set being engageable with the worm wheel, and the other set of threads having the end thereof normally extending beyond said stop means and in bearing engagement with said nut, said last named set of threads being operatively engaged with said nut for moving said worm axially in one direction when the worm is rotated in brake releasing direction, said last named movement of the worm being in a direction reverse to the direction of movement of the engaging portion of the worm wheel during release of the brakes; and manually operated means for rotating said worm member.

5. In a hand brake mechanism, the combination with a rotary tightening element; of a worm wheel member operatively connected to said element for rotating the same; a threaded member held against rotary movement, said member having limited axial movement; spring means opposing axial movement of said threaded member in one direction; an axially displaceable rotary worm member having two sets of threads, one set being engageable with the worm wheel, and the other set of threads being engageable with the threaded member for moving said worm axially in one direction when the worm is rotated in brake tightening direction and axially in a reverse direction when the worm is rotated in brake releasing direction, said last named movement of the worm being in a direction reverse to the direction of movement of the engaging portion of the worm wheel during release of the brakes; and manually operated means for rotating said worm member.

6. In a hand brake mechanism, the combination with a rotary tightening element; of a worm wheel member operatively connected to said element for rotating the same; means for rotating said worm wheel including an axially displaceable worm having two sets of threads, one set being engageable with the worm wheel; a displaceable threaded element; means normally urging said threaded element into engagement with the other set of threads of said worm; means for holding said threaded element against rotation; means for limiting displacement of said threaded member toward said worm, said threaded element while engaged with the worm effecting movement of said worm axially in one direction when the worm is rotated in brake tightening direction and effecting movement of said worm axially in a reverse direction when the worm is rotated in brake releasing direction, said last named movement of the worm being in a direction reverse to the direction of movement of the engaging portion of the worm wheel during release of the brakes; and manually operated means for rotating said worm member.

7. In a hand brake mechanism, the combination with a worm wheel; of a rotary tightening element rotatable with said worm wheel; an axially displaceable rotary worm member having two sets of like threads thereon, one set of threads being normally in engagement with the threads of the worm wheel; a fixed stop shoulder beyond which the other set of threads normally projects; a threaded member displaceable in a direction lengthwise of the worm and having its movement toward said worm limited by engagement with said stop shoulder, said last named set of threads being normally in bearing contact with the threaded member to be operatively engaged therewith upon rotation of said worm member in brake releasing direction, to thread said worm member into said threaded member to displace said worm member axially in a direction reverse to the direction of movement of the engaging portion of said worm wheel in release of the brakes, said threaded member being held against rotation; and means for rotating said worm member.

8. In a hand brake mechanism, the combination with a worm wheel; of a rotary tightening element rotatable with said worm wheel; an axially displaceable rotary worm member having two sets of like threads, one of said sets of threads being of greater pitch than the other, said set of greater pitch being normally in engagement with the threads of the worm wheel; a threaded member with which the other set of threads of said worm is engageable upon rotation of said worm member in brake releasing direction to thread said worm into said threaded member to displace the worm axially in a direction reverse to the direction of movement of the engaging portion of said worm wheel in release of the brakes, said threaded member being held against rotation; and means for rotating said worm member.

9. In a hand brake mechanism, the combination with a rotary tightening element; of a worm wheel member connected to said element for rotating the same; an axially displaceable worm element; a thrust bearing, one end of said worm being rotatably supported on said bearing; a set of right threads at the other end of said worm, a second set of right threads on the worm between said last named end and the thrust bearing, said second named set of threads being engageable with the worm wheel; a nut at said second named end of the worm movable toward the worm for engagement with the first named set of threads; means for holding said nut against rotation, said nut being normally urged toward said end of the worm; stop means for limiting movement of said nut toward the worm element; and means for rotating the worm.

10. In a hand brake mechanism, the combination with a rotary tightening element; of a worm wheel member connected to said element for rotating the same; an axially displaceable worm element; a thrust bearing, one end of said worm being rotatably supported on said bearing; a set of right threads at the other end of said worm, a second set of right threads on the worm between said last named end and the thrust bearing, said second named set of threads being engageable with the worm wheel; a nut at said second named end of the worm, said nut being held against rotation, and having limited movement in a direction lengthwise of the worm, said nut being engageable with the first named set of threads of the worm; means for yieldingly pressing said nut against said first named set of threads; and means for rotating said worm.

11. In a hand brake mechanism, the combination with a rotary tightening element; of a worm wheel member connected to said element for rotating the same; an axially displaceable worm element; a thrust bearing, one end of said worm being rotatably supported on said bearing; a set of right threads at the other end of said worm, a second set of right threads on the worm between said last named end and the thrust bearing, said second named set of threads being engageable with the worm wheel; a nut at said second named end of the worm, said nut being held against rotation, and having movement in a direction lengthwise of the worm; a stop shoulder limiting movement of said nut toward the worm; means for yieldingly pressing the nut against said first named set of threads; and means for rotating said worm.

12. In a hand brake mechanism, the combination with a rotary tightening element; of a worm wheel member connected to said element for rotating the same; an axially displaceable worm element; a thrust bearing, one end of said worm being rotatably supported on said bearing; a set of threads at the other end of said worm, a second set of like threads on the worm between said last named end and the thrust bearing, said second named set of threads being engageable with the worm wheel; a nut at said second named end of the worm normally supported on the end of the first named set of threads and being engageable with the first named set of threads to move said worm axially in a direction reverse to the direction of movement of the engaging portion of the worm wheel while the brakes are being released, said nut being normally urged toward said second named end of the worm; a supporting stop for said nut beyond which said second named set of threads projects when the worm is supported on said thrust bearing; and means for rotating said worm.

13. In a hand brake mechanism, the combination with a rotary tightening element; of a worm wheel member connected to said element for rotating the same; an axially displaceable worm element; a thrust bearing, one end of said worm being rotatably supported on said bearing; a set of threads at the other end of said worm, a second set of like threads on the worm between said last named end and the thrust bearing, said second named set of threads being engageable with the worm wheel; a nut at said second named end of the worm, said nut being held against rotation, and having limited movement in a direction lengthwise of the worm, said nut being engageable with the first named set of threads of the worm to move said worm axially in a direction reverse to the direction of movement of the engaging portion of the worm wheel while the brakes are being released; means for yieldingly pressing said nut against said first named set of threads; and means for rotating said worm.

14. In a hand brake mechanism, the combination with a rotary tightening element; of a worm wheel member connected to said element for rotating the same; an axially displaceable worm element; a thrust bearing, one end of said worm being rotatably supported on said bearing; a set of threads at the other end of said worm, a second set of like threads on the worm between said last named end and the thrust bearing, said second named set of threads being engageable with the worm wheel; a nut at said second named end of the worm, said nut being held against rotation, and having movement in a direction lengthwise of the worm, the threads of said nut being engageable with the first named set of threads of the worm to move said worm axially in a direction reverse to the direction of movement of the engaging portion of the worm wheel while the brakes are being released; a stop shoulder limiting movement of said nut toward the worm; means for yieldingly pressing the nut against said first named set of threads; and means for rotating said worm.

HENRY FUCHS.